United States Patent
Ricketts

(10) Patent No.: US 10,994,713 B2
(45) Date of Patent: May 4, 2021

(54) BRAKE TRACTION CONTROL SYSTEM FOR A VEHICLE, VEHICLE INCLUDING SAME AND METHOD THEREOF

(71) Applicant: Honda Motor Co., Ltd., Tokyo (JP)

(72) Inventor: Brandon E. Ricketts, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 16/437,313

(22) Filed: Jun. 11, 2019

(65) Prior Publication Data
US 2020/0391710 A1    Dec. 17, 2020

(51) Int. Cl.
| | |
|---|---|
| B60T 8/1761 | (2006.01) |
| B60T 13/66 | (2006.01) |
| B60T 8/58 | (2006.01) |
| B60T 8/172 | (2006.01) |
| B60T 8/17 | (2006.01) |

(52) U.S. Cl.
CPC .......... B60T 8/1761 (2013.01); B60T 8/1701 (2013.01); B60T 8/172 (2013.01); B60T 8/58 (2013.01); B60T 13/662 (2013.01)

(58) Field of Classification Search
CPC .......... B60T 13/662; B60T 8/58; B60T 8/171; B60T 8/172; B60T 8/1701; B60T 8/1761; B60T 8/17613; B60T 8/17633
USPC ........................................................ 303/183
See application file for complete search history.

(56) References Cited

U.S. PATENT DOCUMENTS

| | | | |
|---|---|---|---|
| 5,215,159 A * | 6/1993 | Nishida | B60K 31/0008 180/169 |
| 6,007,454 A | 12/1999 | Takahira et al. | |
| 8,843,288 B1 | 9/2014 | Rogalski et al. | |
| 9,522,680 B2 | 12/2016 | Richards et al. | |
| 9,932,034 B2 | 4/2018 | Woodley | |
| 10,155,516 B2 | 12/2018 | Kelly | |
| 2005/0001481 A1 | 1/2005 | Kley et al. | |
| 2014/0229086 A1* | 8/2014 | Udaka | B60T 8/1766 701/75 |

(Continued)

FOREIGN PATENT DOCUMENTS

WO    2018077813 A1    5/2018

*Primary Examiner* — Robert A. Siconolfi
*Assistant Examiner* — San M Aung
(74) *Attorney, Agent, or Firm* — Kenealy Vaidya LLP

(57) ABSTRACT

A brake traction control system for a vehicle a braking input member, a brake modulator and a controller. The braking input member can be manually actuated and controllable to manipulate the vehicle braking system by controlling the pressure. The brake modulator can be controllable to manipulate the vehicle braking system by controlling the pressure. The controller can be configured to control the brake modulator in an obstacle crawl control mode such that the controller controls the brake modulator to adjust the pressure. The controller can perform processing in the obstacle control mode including: performing a first determination to determine whether the acceleration input member is actuated to control the power source assembly to propel the vehicle; performing a second determination to determine whether a speed of the vehicle satisfies predetermined criteria; and controlling the pressure based on the first determination and the second determination.

20 Claims, 5 Drawing Sheets

(56) References Cited

U.S. PATENT DOCUMENTS

2016/0185216 A1\* 6/2016 Clarke ................... B60K 17/35
                                                        74/665 F
2016/0244039 A1\* 8/2016 Rizzo ...................... B60T 8/322
2017/0144661 A1\* 5/2017 Miller ....................... B60T 7/12

\* cited by examiner

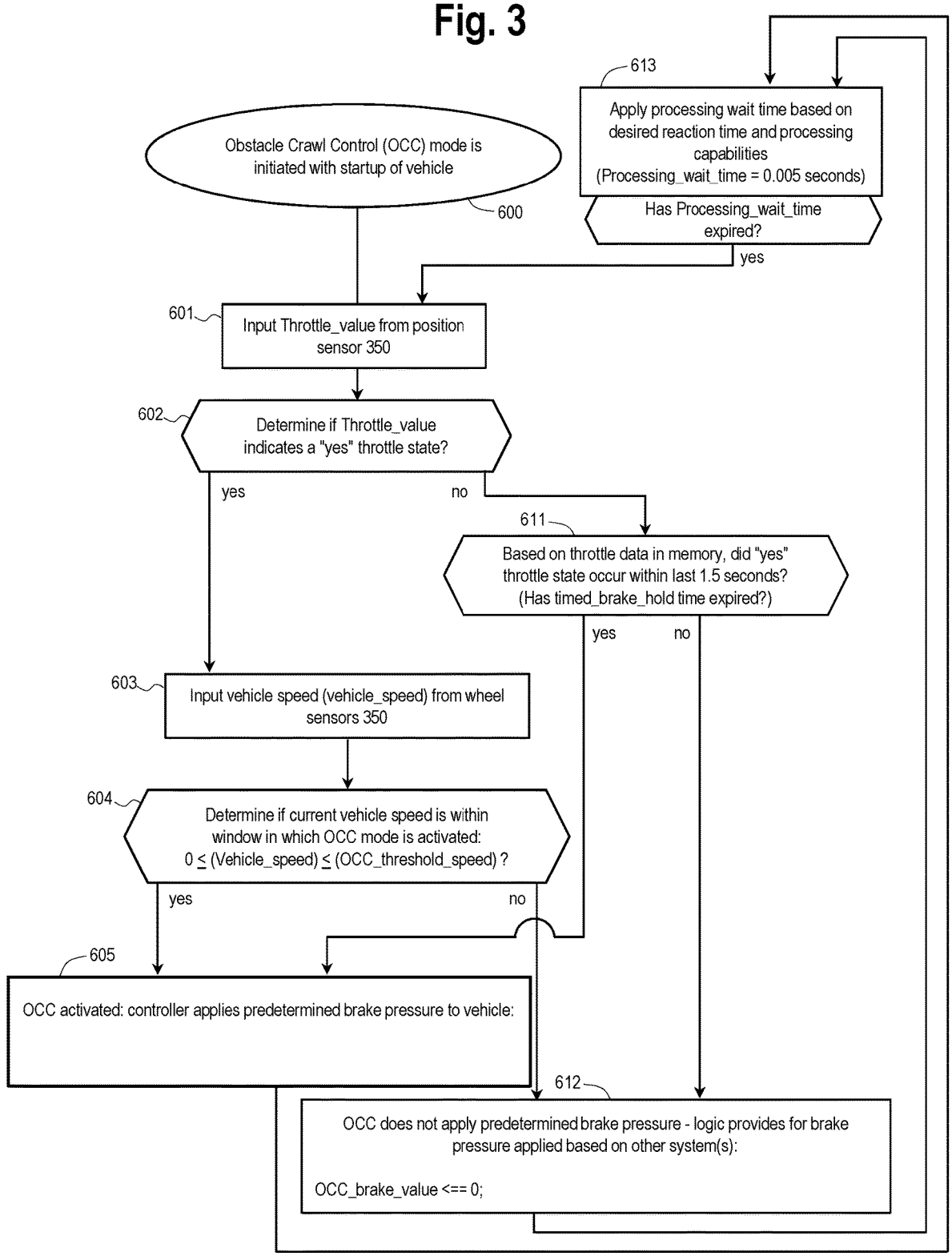

Fig. 4

400 data memory portion

| Variable | Exemplary Value | Description |
|---|---|---|
| Vehicle_speed | variable value | Speed of the vehicle. |
| Throttle_value | Yes/no value | This value is input from an accelerator position sensor to determine whether acceleration input member is engaged to propel the vehicle. The acceleration input member can be a throttle valve or a movable pedal. |
| OCC_threshold_speed | 5 MPH | This is the threshold speed, i.e. cutoff speed, above which OCC (Obstacle Crawl Control) is not invoked. |
| OCC_brake_value | 2.5 | This value is applied to the vehicle when OCC is invoked.<br>Scale:<br>0=no braking pressure; and<br>10=maximum braking pressure of vehicle) |
| Processing_wait_time | 0.005 second | This can be changed in logic. This value determines reaction time of the OCC and processing resources required for OCC processing. |
| Timed_brake_hold | 1.5 seconds | Amount of time that OCC is applied, i.e. to maintain brake pressure, after throttle drop. |

401

BRAKE TRACTION CONTROL SYSTEM FOR A VEHICLE, VEHICLE INCLUDING SAME AND METHOD THEREOF

BACKGROUND

The disclosed subject matter relates to apparatus for a brake traction control system for a vehicle and a method thereof. More particularly the subject matter relates to a brake traction control system that can be configured to apply a braking torque to the drive wheels independently of a difference in wheel speed or torque between the drive wheels.

A self-propelled vehicle can be configured to travel along: (a) an improved path (such as paths paved with a durable surface material, e.g., asphalt, concrete, stone, brick, etc.), (b) an unimproved path (such as a dirt path), and/or (c) any unmarked path of travel (such as along a wooded area, open field, rocky area, water feature, etc.). Off-road vehicles can be specially configured to enhance performance while traveling along an unimproved or unmarked path of travel. This specialized configuration can include increased suspension travel, increased ground clearance, and/or enhanced durability, as compared to vehicles configured for travel along an improved path.

While traversing an unimproved or unmarked path, a vehicle can encounter a travel surface in which the coefficient of friction ($\mu$) on one side of the vehicle is different that the coefficient of friction on the other side of the vehicle. This surface can be referred to as a split $\mu$ surface. The vehicle can include a mechanical locking differential or brake based traction control system to deliver torque to the wheel with the most traction while traveling along a split $\mu$ surface.

SUMMARY

Some embodiments are directed to a brake traction control system for a vehicle including a vehicle braking system, a power source assembly and a manually operated acceleration input member that controls the power source assembly. The vehicle braking system can include friction members for controlling vehicle speed based on application of pressure. The brake traction control system can include a braking input member, a brake modulator and a controller. The braking input member can be manually actuated and controllable to manipulate the vehicle braking system by controlling the pressure. The brake modulator can be controllable to manipulate the vehicle braking system by controlling the pressure. The controller can be configured to control the brake modulator in an obstacle crawl control mode such that the controller controls the brake modulator to adjust the pressure. The controller can perform processing in the obstacle control mode including: performing a first determination to determine whether the acceleration input member is actuated to control the power source assembly to propel the vehicle; performing a second determination to determine whether a speed of the vehicle satisfies predetermined criteria; and controlling the pressure based on the first determination and the second determination.

Some embodiments are directed to a vehicle that can include a power source assembly, a pair of drive wheels, a differential assembly, an acceleration input member, and a vehicle braking system. The pair of drive wheels can be configured to be driven by the power source assembly. The differential assembly can be connected between the power source and the pair of drive wheels and configured to allow at least one of a speed difference and a torque difference between the pair of wheels when the differential receives a drive torque from the power source assembly. The acceleration input member can be manually operated and control the power source assembly to propel the vehicle. The vehicle braking system can include friction members for controlling vehicle speed based on application of fluid pressure. The vehicle braking system including a braking input member, a brake modulator and a controller. The braking input member can be manually actuated and controllable to manipulate the vehicle braking system by controlling the fluid pressure. The brake modulator can be controllable to manipulate the vehicle braking system by controlling the fluid pressure. The controller can be configured to control the brake modulator to operate in an obstacle crawl control mode such that the controller controls the brake modulator to adjust the fluid pressure. The controller can perform processing in the obstacle control mode including: performing a first determination to determine whether the acceleration input member is actuated to control the power source assembly to propel the vehicle; performing a second determination to determine whether speed of the vehicle satisfies predetermined criteria; and controlling the fluid pressure based on the first determination and the second determination.

Some embodiments are directed to a method of controlling traction for drive wheels of a vehicle, the method can include: providing a vehicle with a vehicle braking system that includes friction members for controlling vehicle speed based on application of fluid pressure, the vehicle including a power source assembly and a manually operated acceleration input member that controls the power source assembly to propel the vehicle along the inclined surface. The vehicle can include a braking input member and a brake modulator. The braking input member can be manually actuated and controllable to manipulate the vehicle braking system by controlling the fluid pressure. The brake modulator can be controllable to manipulate the vehicle braking system by controlling the fluid pressure. The method can further include: providing a controller that controls the brake modulator to operate in an obstacle crawl control (OCC) mode such that the controller controls the brake modulator to adjust the fluid pressure; performing, by the controller in the OCC mode, a first determination to determine whether the acceleration input member is actuated to control the power source assembly to propel the vehicle; performing, by the controller in the OCC mode, a second determination to determine whether speed of the vehicle satisfies predetermined criteria; and controlling, by the controller in the OCC mode, the fluid pressure based on the first determination and the second determination.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is a flowchart showing processing performed by a controller of the vehicle in a control mode, which can include an Obstacle Climb Control (OCC) mode, in accordance with principles of the disclosure.

FIG. 4 is a data memory portion that can be in the controller or accessed by the controller in accordance with principles of the disclosure.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

A mechanical locking differential can transfer torque to the wheel with traction on a split μ surface. However, the mechanical locking differential, whether manually or automatically activated, can add weight and complexity to the vehicle. Further, a mechanically locking differential relies on a predetermined difference in wheel speed or torque in order place the differential in a locked state. However, it is possible during low speed operation of the vehicle, that a difference in wheel speeds or torque does not reach the threshold for activating the locked state of the differential. Thus, it is possible for the vehicle to lose traction with the travel surface during this low speed operation.

A traction control system can use the existing braking system of a vehicle to apply a brake torque to the slipping wheel when the vehicle encounters a split μ surface. Thus, the vehicle can avoid the weight and complexity penalties of a mechanically locking differential. However, the brake-based traction control system also relies on a predetermined difference in wheel speeds before the system applies a brake torque to the slipping wheel. Thus, it is possible for the vehicle to lose traction with the travel surface during this low speed operation.

Rock crawling is an exemplary low speed operation where the vehicle can encounter a split μ surface or obstacle. In extreme rock crawling situations, it can be advantageous to quickly transmit a relatively large amount of torque to the tractive tire in order to maintain position on the rock and make progress over the rock. However, it can be difficult for a conventional mechanical locking differential or brake-based traction control system to transfer a preferred amount of torque with sufficient timing to the wheel with traction. In this situation, the vehicle can fail to traverse the rock due a lack of traction.

Accordingly, there is a need for an apparatus and method that can enhance the tractive effort for a vehicle traversing a split μ surface at relatively low vehicle speeds.

Further, there is a need for an apparatus and method that can maintain the current progress of the vehicle traversing a split μ surface or obstacle (such as but not limited to a rock) so that vehicle does not inadvertently travel off the obstacle before the operator applies the vehicle's brakes.

Figure 1:
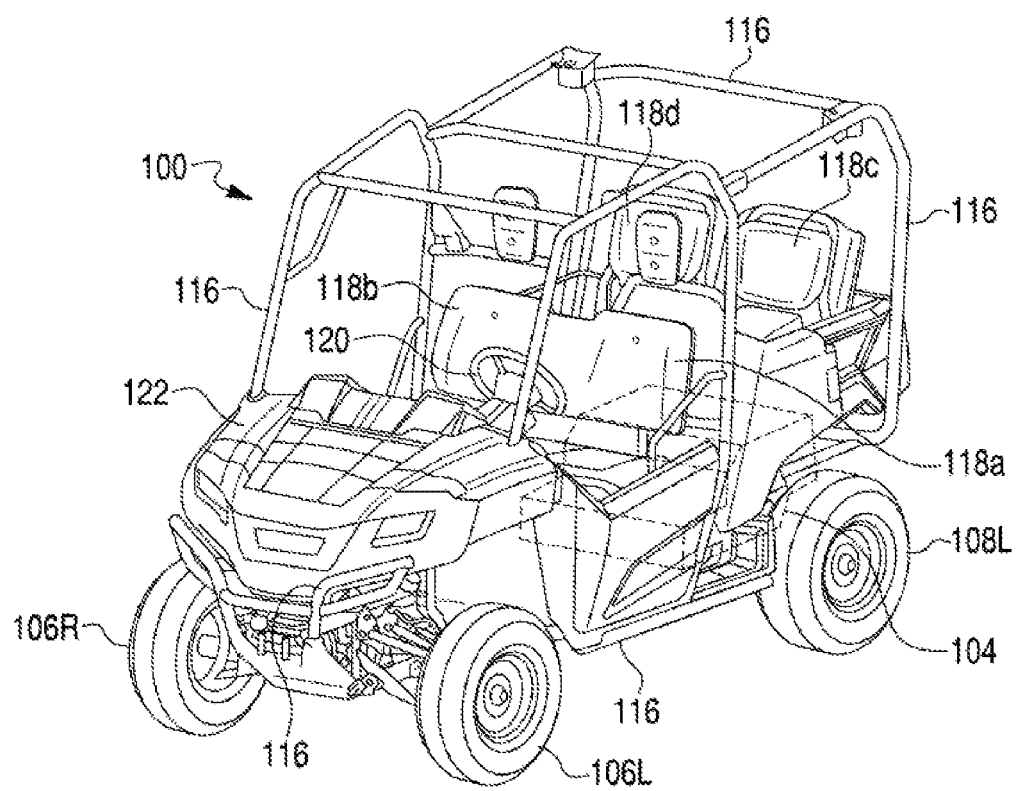
FIG. 1 is a perspective view of an exemplary vehicle in accordance with principles of the disclosed subject matter.

FIG. 1 is a perspective view of an exemplary vehicle 100 in accordance with the disclosed subject matter. The exemplary vehicle 100 of FIG. 1 is configured for travel along any one or combination of improved, unimproved, and unmarked paths. The vehicle 100 can be specialized for use on an unimproved path or on an unmarked path, and referred to as a multipurpose utility vehicle (MUV) or as a side-by-side all-terrain vehicle (S×S, or S×S ATV).

Figure 2:
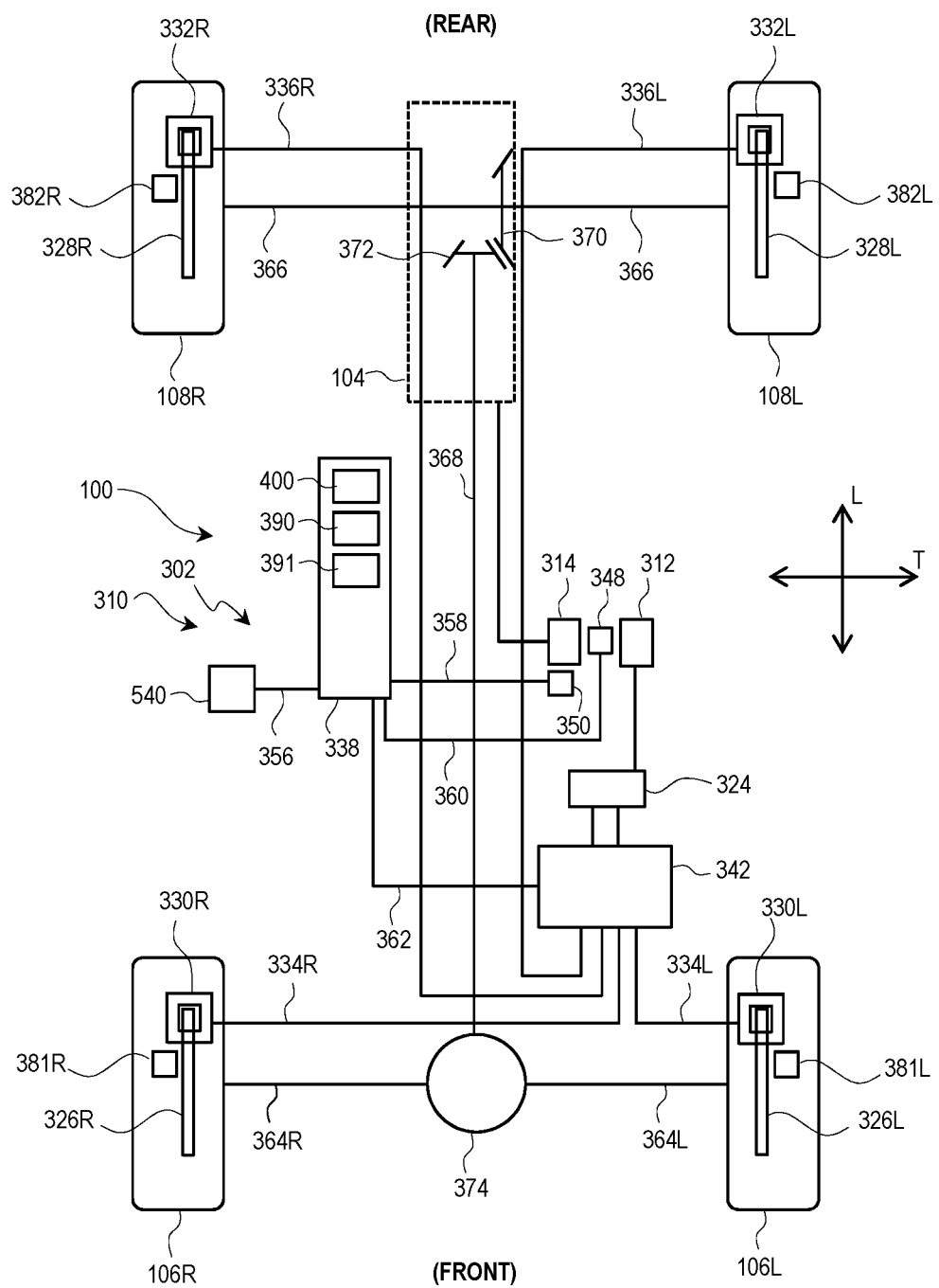
FIG. 2 is a schematic view of the vehicle of FIG. 1 having an exemplary drivetrain and control configuration in accordance with principles of the disclosed subject matter

The vehicle 100 can include a power source assembly 104, a pair of front wheels 106L, 106R, a pair of rear wheels 108L, 180R (the right rear wheel 108R is obstructed from view in FIG. 1—see FIG. 2), a vehicle braking system, a braking input member, an acceleration input member, and a brake control system. The power source assembly 104 is shown schematically in FIG. 1 in phantom lines. The vehicle braking system, the braking input member and the acceleration input member are omitted from FIG. 1 for clarity of the drawing figure, but are schematically represented in FIG. 2.

In accordance with the disclosed subject matter, the vehicle 100 can include a brake traction control system (BTCS) and an obstacle crawl control (OCC) system. The BTCS can apply a braking torque to a slipping drive wheel when the BTCS determines a predetermined difference in wheel speed or torque between the pair of drive wheels The predetermined difference wheel speed or torque can impede operation of the BTCS at relatively low vehicle speeds such as but not limited to 5 mph. The OCC system can be configured to enhance traction on a split μ surface at vehicle speeds where the BTCS effectiveness may be limited or reduced. For example, the OCC system can be advantageous when maneuvering the vehicle 100 over obstacles such as but not limited to rocks or rocky terrain. The OCC system can apply a small amount of brake pressure as soon the throttle is applied. That is, the OCC system can be initiated independently of a determined difference in wheel speed or torque between the drive wheels. The OCC system can maintain the brake pressure up to a certain threshold wheel speed. Further details are described below.

The vehicle 100 can include a frame assembly 116, a plurality of seats 118a, 118b, 118c, 118d, a steering input member 120, and a body panel 122. The seats 118a, 118b, 118c, 118d, the steering input member 120, the body panel 122, the power source assembly 104, and the wheels 106L, 106R, 108L, 108R can be directly or indirectly mounted to the frame assembly 116 in any appropriate manner. The power source assembly 104 can be coupled to at least one of the wheels 106L, 106R, 108L, 108R in any appropriate manner to propel the vehicle 100. In an exemplary embodiment, the power source assembly 104 can be directly or indirectly coupled to at least the pair of rear wheels 108L, 108R. The vehicle 100 can include one body panel 122 or a plurality of body panels directly or indirectly secured to the frame assembly 116.

At least a portion of the power source assembly 104 can be located underneath at least one of the seats 118a, 118b, 118c, 118d. In some of these exemplary embodiments, at least a portion of the power source assembly 104 is located underneath the rear row of seats 118c, 118d.

FIG. 2 is a schematic view of the vehicle 100 of FIG. 1 having an exemplary drivetrain configuration and a brake control system 302 in accordance with the disclosed subject matter. The vehicle 100 can include vehicle braking system 310, a braking input member 312 and an acceleration input member 314. The power source assembly 104 is shown in phantom lines in FIG. 2.

In accordance with the disclosed subject matter, the brake control system 302 can operate the vehicle braking system 310 to slow or stop the vehicle 100. The brake control system 302 can be configured to actuate the vehicle braking system 310 under certain circumstances, even though the operator is not applying an input to the braking input member 312. For example, the brake control system 302 can be configured to operate as a hill start assist system that applies the a braking torque to each of the wheels 106L, 106R, 108L, 108R when the vehicle 100 stops on an inclined surface in order to hold the vehicle 100 stationary as the operator transitions from braking input member 312 to an acceleration input member 314. The brake control system 302 can be configured to operate as the BTCS such that the brake control system 302 applies a braking torque to a slipping wheel and can transfer a reaction torque to the wheel that has traction. The brake control system 302 can be configured to operate as the OCC system such that the brake control system 302 applies a braking torque to the front wheels 106L, 106R when the operator actuates the acceleration input member 314 and the vehicle speed is below a predetermined threshold speed.

The vehicle braking system 310 can be in communication with the brake control system 302. The vehicle braking system 310 can be configured to slow or stop traveling motion of the vehicle 100 in response to an input applied by an operator of the vehicle 100 to the braking input member 312.

The braking input member 312 can be in communication with the vehicle braking system 310 and the brake control system 302. In an exemplary embodiment, the braking input member 312 can be configured as a movable pedal. For example, the pedal can be disposed above the floor of the vehicle 100 to be manually movable by the vehicle operator's foot to effectuate the braking operation.

The vehicle braking system 310 can include at least one first friction member mounted to rotate with a corresponding one of the wheels 106L, 106R, 108L, 108R, and at least one second friction member movable into and out of engagement with the at least one first friction member. The at least one second friction member can be in communication with the braking input member, such as via a wire cable, fluid in a conduit, etc. In an exemplary embodiment, the vehicle braking system can include four disc rotors (one for each wheel), four brake calipers (one for each wheel), and a hydraulic fluid circuit in communication with a brake pedal and each of the four calipers.

The acceleration input member 314 can be in communication with the power source assembly 104 and the brake control system. This communication can be performed using various technologies, including mechanical, electrical, or electro-mechanical technologies. In an exemplary embodiment, the acceleration input member 314 can be configured as a pedal movably mounted to the frame assembly 116 and adjacent to the left front seat 118a. For example, the pedal can be disposed above the floor of the vehicle 100 to be manually movable by the vehicle operator's foot to effectuate acceleration order to maintain a desired speed of the vehicle 100. Specifically, the acceleration input member 314 can transmit an input from the vehicle operator to the power source assembly 104 in order to regulate the drive output of the power source assembly 104. The drive output of the power source assembly 104 can be applied to the at least one of the wheels 106L, 106R, 108L, 108R. The acceleration input member 314 can be movable from a released position to an open position. The acceleration input member 314 can be biased toward an accelerator released position, and can be displaced away from the accelerator released position by the vehicle operator. If the acceleration input member 314 is in the released position, then the output of the power source assembly 104 can be an idle output that can be insufficient to propel the vehicle 100, or at most, sufficient to propel the vehicle 100 at a relatively slow speed. If the operator displaces the acceleration input member 314 away from the released position, then the acceleration input member 314 can transmit an input to the power source assembly 104 to cause the power source assembly 104 to propel the vehicle 100. If the power source assembly 104 includes an internal combustion engine, the accelerator released position can correspond to the closed position of the throttle valve. The acceleration input member 314 can be movable to any incremental position between the released position and the open position.

The vehicle braking system 310 can include a master cylinder 324, a plurality of first friction members 326L, 326R, 328L, 328R, a plurality of second friction members 330L, 330R, 332L, 332R, and a plurality of communication lines 334L, 334R, 336L, 336R. The vehicle braking system 310 can include additional components, such as but not limited to a proportional control valve, fluid reservoir, etc.

The master cylinder 324 can be in communication with the braking input member 312. The braking input member 312 can transmit an input from the operator to at least one of the second friction members 330L, 330R, 332L, 332R via the master cylinder 324. This communication can be performed using various technologies, such as mechanical, electro-mechanical, or electrical technologies. The master cylinder 324 can be in communication with the second friction members 330L, 330R, 332L, 332R via the communication lines 334L, 334R, 336L, 336R. This communication can be fluid communication via a hydraulic fluid or a pneumatic fluid. The communication lines 334L, 334R, 336L, 336R can be configured as fluid conduits. The master cylinder 324 can be configured to convert displacement of the braking input member 312 into a corresponding fluid pressure in the communication lines 334L, 334R, 336L, 336R. The disclosure is not limited to specifically fluid pressure. For example, the braking input member 312 can transmit an input from the operator to at least one of the second friction members 330L, 330R, 332L, 332R via other arrangement or device. Such other arrangement or device can include a cable arrangement or an electric servo, for example.

Each of the first friction members 326L, 326R, 328L, 328R can be mounted to rotate with a respective one of the wheels 106L, 106R, 108L, 108R. The plurality of second friction members 330L, 330R, 332L, 332R can be fixed relative to the frame 116 of the vehicle 100. The plurality of second friction members 330L, 330R, 332L, 332R can be movable into and out of engagement with the respective one of the first friction members 326L, 326R, 328L, 328R. Each of the second friction members 330L, 330R, 332L, 332R can be in communication with the braking input member 312 via the respective one of the communication lines 334L, 334R, 336L, 336R. In an exemplary embodiment, the first friction members 326L, 326R, 328L, 328R can be configured as disc rotors, and the second friction members 330L, 330R, 332L, 332R can be configured as brake calipers. Each caliper can include at least one piston, and at least one brake pad that can be moved into and out of engagement with a respective one of the first friction members 326L, 326R, 328L, 328R based on the fluid pressure transmitted by the master cylinder 324 to the piston of each of the second friction members 330L, 330R, 332L, 332R via the communication lines 334L, 334R, 336L, 336R.

The brake control system 302 can include a controller 338, switch 540, brake modulator 342, plurality of position sensors 348 that can input and relay position of respective brake components, and plurality of electrical communication lines 356, 358, 360, 362.

The controller 338 also can be referred to as an electronic control unit (ECU) or as a central processing unit (CPU). The controller 338 can be configured with hardware and/or software, i.e. an Object Climb Control (OCC) System 390, that can permit the controller 338 to operate the brake control system 302 in an OCC mode. The controller 338 can also be configured with hardware and/or software, i.e. a Brake Traction Control System (BTCS) 391, that can operate the brake control system 302 in a BTCS mode. The OCC system 390 of the disclosure can be used in conjunction with the BTCS 391.

The electrical communication lines 356, 358, 360, 362 can connect the controller 338 to the switch 540, position sensors 348, 350, and the brake modulator 342 in any appropriate manner. Electrical communication can be either one-way communication or two-way communication, and can be networked or not networked. The position sensor 348 can be a brake position sensor. The position sensor 350 can be an accelerator position sensor.

The OCC system can be automatically activated or deactivated as conditions warrant. In alternate embodiments, the switch 540 can be configured to permit the operator of the vehicle 100 to at least selectively activate or deactivate the OCC mode of the brake control system 302. The switch 540 can have any configuration that enables transmission of the operator's activation request to the controller 338. The switch 540 can include hardware and/or software to perform the assigned task(s). The signal transmitted by the switch 540 can include data indicative of an ON position of the switch 540 and/or an OFF position of the switch. In an alternative embodiment, the signal can include data indicative of contact of the switch 540 by the operator.

The brake modulator 342 can include at least one fluid circuit component that can permit the brake modulator 342 to selectively and independently vary the fluid pressure in each of the communication lines 334L, 334R, 336L, 336R. The brake modulator 342 can include at least one regulator valve. The regulator valve can be in fluid communication with the communication lines 334L, 334R, 336L, 336R. The regulator valve can define an open position and a closed position. If the regulator valve is in the open position, the fluid pressure in the communication lines 334L, 334R, 336L, 336R and at the second friction members 330L, 330R, 332L, 332R can be released so that the second friction members 330L, 330R, 332L, 332R can be disengaged from the first friction members 326L, 326R, 328L, 328R. If the regulator valve is in the closed position, the fluid pressure in the communication lines 334L, 334R, 336L, 336R and at the second friction members 330L, 330R, 332L, 332R can be maintained at the pressure set by the master cylinder 324 or by the brake modulator 342. The regulator valve can be positioned in any position between the closed position and the opened position in order to vary the rate at which fluid pressure can be released in the communication lines 334L, 334R, 336L, 336R and at the second friction members 330L, 330R, 332L, 332R.

The position sensors 348, 350 can include hardware and/or software to perform the assigned task(s). The position sensors 348, 350 can be configured as smart sensors, such that the position sensors 348, 350 store, process, and/or manipulate the raw data that they collect prior to transmission to the controller 338. Alternatively, the position sensors 348, 350 can be configured as simple sensors that pass the raw data directly to the controller 338 without any manipulation or modification of the raw data. The position sensors 348, 350 can be configured to send data to the controller 338, with or without a prompt from the controller 338.

The vehicle 100 can also include first and second speed sensors 381L, 381R, 382L, 382R. The first speed sensors 381L, 381R can be provided to monitor speed of the front wheels 106L, 106R. The second speed sensors 382L, 382R can be provided to monitor speed of the rear wheels 106L, 106R. The speed sensors 381L, 381R, 382L, 382R can include hardware and/or software to perform the assigned task(s). The speed sensors 381L, 381R, 382L, 382R can be configured as smart sensors, such that the speed sensors 381L, 381R, 382L, 382R store, process, and/or manipulate the raw data that they collect prior to transmission to the controller 338. Alternatively, the speed sensors 381L, 381R, 382L, 382R can be configured as simple sensors that pass the raw data directly to the controller 338 without any manipulation or modification of the raw data. The speed sensors 381L, 381R, 382L, 382R can be configured to send data to the controller 338, with or without a prompt from the controller 338.

The power source assembly 104 can be coupled to at least one of the wheels 106L, 106R, 108L, 108R in any appropriate manner to propel the vehicle 100. In an exemplary embodiment, the power source assembly 304 can be coupled to all of the wheels 106L, 106R, 108L, 108R. The vehicle 100 can include a pair of front driveshafts 364L, 364R, rear driveshaft 366, propeller shaft 368, bevel gear 370, pinion gear 372 and front differential assembly 374. The vehicle 100 can include a limited slip differential that connects the bevel gear 370 to each of the rear driveshaft 366. The power source assembly 104 can be directly or indirectly coupled to the driveshafts 364L, 364R, 366; the driveshafts 364L, 364R can be directly or indirectly coupled to a respective one of the front wheels 106L, 106R; and the rear driveshaft 366 can be directly or indirectly coupled to each of the rear wheels 108L, 108R in any appropriate manner that permits the transfer of torque between the power source assembly 104, the driveshafts 364L, 364R, 366, and the wheels 106L, 106R, 108L, 108R.

The rear differential can be connected between the power source assembly 104 and the rear wheels 108L, 108R and configured to allow at least one of a speed difference and a torque difference between the rear wheels 108L, 108R when the differential receives a drive torque from the power source assembly 104. Any appropriate differential assembly, such as but not limited an open differential gear assembly, a limited slip differential gear, a viscous coupling assembly, and a friction clutch plate assembly can be used as the rear differential.

The front differential assembly 374 can be connected between the power source assembly 104 and the front wheels 106L, 106R and configured to allow at least one of a speed difference and a torque difference between the rear wheels 108L, 108R when the front differential 374 receives a drive torque from the power source assembly 104. The front differential 374 can be configured as a torque biasing differential. The torque biasing differential can include an additional gear assembly that frictionally engages the housing of the differential gear assembly when there is a difference in wheel speed or torque between the front wheels 106R, 106L. The torque biasing differential 374 can multiply reaction torque due to the frictional engagement with the housing and based on the gear tooth arrangement of the additional gears. During operation of the BTCS 391, the torque biasing differential 374 can multiply the brake torque that is applied to the slipping wheel and transfer this multiplied torque to the wheel with traction.

The OCC system 390 can take advantage of this torque transfer when the vehicle is traversing a split μ obstacle at a relatively low speed such as traversing over a rock or a rocky area. As discussed above, it can be advantageous to immediately send a relatively large amount of torque to the tractive tire in order to maintain position on the rock and make progress over the rock. Additionally, regardless of the use or nonuse of a brake traction control system, an operator may need to and may tend to utilize two foot operation in obstacle crawling situations. Such two foot operation can prevent the vehicle from rolling backwards and losing progress upon an operator releasing his or her foot from the acceleration pedal. Such two foot operation can prevent the vehicle from inadvertently moving across the obstacle such that the vehicle frame is dropped onto the particular obstacle.

The OCC system 390 can be a processing component or portion of the controller 338 that provides the OCC mode. The OCC system 390 can be activated for low speed obstacle crawling operation of a vehicle 100. For example, the OCC system 390 can operate below a predetermined speed threshold. The predetermined speed threshold can be any appropriate speed in order to achieve desired dynamic performance of the vehicle 100. Since the OCC system 390 is implemented at relatively slow vehicle speeds, the OCC system 390 can be configured to apply a relative small predetermined braking torque to each of the front wheels 106L, 106R independent of any detected slip of either of the front wheels 106L, 106R. This predetermined braking torque can effectively lock the torque biased differential 374 if the front wheels 106L, 106R encounter a split μ obstacle. The predetermined brake torque can be based on a desired dynamic performance of the vehicle 100, the weight of the vehicle, the gross weight rating of the vehicle and any other appropriate parameter(s). If the braking system 310 is configured as a fluid actuated system, the predetermined torque can be converted into a corresponding fluid brake pressure that is generated by the brake modulator 342.

The OCC system can apply a small amount of brake pressure as soon as the operator of the vehicle 100 actuates the acceleration input member 314. The OCC system can maintain the brake pressure up to a predetermined vehicle speed. The vehicle speed can be determined from the data obtained any combination of the wheel speed sensors 381L, 381R, 382L, 382R. In operation of the OCC system 390, the predetermined vehicle speed can be a speed at which the wheel speed differential is no longer an impact to vehicle performance.

In operation, once the vehicle speed drops back to or below such predetermined speed, the OCC system 390 can then reinstate the predetermined brake pressure. The OCC system can maintain of the predetermined brake pressure until the vehicle speed is either increased above the threshold speed again or the accelerator input member 314 is maintained in the released position for a predetermined amount of time. (Releasing the accelerator input member 314 can also be referred to as dropping the throttle or a throttle drop). For example, the predetermined amount of time might be 1.5 seconds. The delay in releasing the brake pressure during the predetermined time interval can allow the operator to transition from the accelerator input member 314 to the braking input member 312 so that the vehicle 100 does not inadvertently move off the obstacle.

Accordingly, the OCC system 390 can provide various advantages. The OCC system can improve traction control performance so that at low-speed, wheel speed differential is not required to achieve torque application through the combination of a brake system and/or a torque biasing differential. Thus, the OCC system 390 can effectively operate as a mode of the BTCS system 391 that functions as if the vehicle possessed a mechanically locked differential at relatively low vehicle speeds.

As a further advantage, the OCC system 390 can assist with maintaining a position of a vehicle 100 during low speed obstacle crawling when the operator of the vehicle releases the acceleration input member 314. The OCC system 390 can eliminate a need for the operator to perform constant two foot operation. In particular, the OCC system can maintain the predetermined braking pressure in order to give an operator the ability to transition his or her foot from the acceleration input member 314 to the braking input member 312 without loss of progress of the vehicle 100 over an obstacle or terrain.

FIG. 3 is a flowchart showing processing performed by the controller 338 of the vehicle 100 operating the OCC system 390. FIG. 4 schematically represents a data memory portion or memory portion 400 that includes a plurality of data records 401. The data records 401 include various values and/or variables that are used by the controller 338 for the OCC system 390. As shown, the data records 401 can also include narrative data regarding the nature of the data in the data memory portion 400. The data memory portion 400 can be stored in a suitable database in the controller 338.

The process of FIG. 3 starts in step 600. In step 600, the controller 338 can initiate the OCC system 390 in conjunction with startup of the particular vehicle 100. Accordingly, the OCC system 390 can be active at any time the vehicle 100 is in an operational state. In alternate embodiments, an operator can selectively turn the OCC system 390 on or off using a suitable switch such as switch 540 of FIG. 2.

After the process is initiated in step 600, the processing can pass to step 601. In step 601, the controller 338 can input data indicating whether the acceleration input member 314 of the vehicle 100 is or is not engaged by the operator. For example, a value (Throttle_value) can be input from the accelerator position sensor 350 and indicative of the position between and including the released position and the open position. As shown in FIG. 4, such a value can be a yes or no value. Such value can be a true or false value. A "yes" or "true" value can be indicative of a position of the acceleration input member 314 that is spaced away from the released position. A "no" or "false" value can be indicative of the released position.

After step 601, the process can pass to step 602. In step 602, the controller 338 can determine if the throttle value indicates a "yes" throttle state. If yes, the process can pass from step 602 to step 603.

In step 603, the controller 338 can input data representing vehicle speed of the vehicle 100. For example, a value (Vehicle speed) can be determined by the controller 338 based on input from suitable sensors such as speed sensors 381L, 381R, 382L, 382R, as shown in FIG. 2. The determination of vehicle speed can be performed by the controller 338 using input from all of the speed sensors 381L, 381R, 382L, 382R. The determination of vehicle speed can be performed by the controller 338 using input from one or more speed sensors 381L, 381R, 382L, 382R. The determination of vehicle speed can also be based in whole or in part on other systems on or associated with the vehicle 100 such as but not limited to a transmission output shaft speed or an engine speed and selected transmission gear ratio.

After step 603 of FIG. 3, the process can pass to step 604. In step 604, the controller 338 determines if the current vehicle speed is less than or equal to a predetermined threshold speed at which OCC mode is activated, invoked, or applied. For example, a window or range of speed can illustratively be 0 mph (miles per hour) to 5 mph. However, the disclosure is not limited to such particulars and other ranges or windows of speed can be utilized as may be desired. The predetermined speed threshold (OCC_threshold_speed) can be stored in the data memory portion 400. Such value can constitute a threshold speed, i.e. a cutoff speed, above which OCC mode is not activated. Such value can be input or accessed by the controller 338, from the data memory portion 400, and used in the processing of step 604. Such 5 mph value can define a top end of the range of speed in which the OCC system 390 is activated, with the low end being 0 (zero). However, a low-end of the range, in which OCC is activated, is not limited to a 0 (zero) speed, as illustratively shown in step 604. Accordingly, any suitable values, i.e. endpoints, can be utilized so as to define a range or window of speed, that is used in the processing of step 604.

In the processing of step 604, if a "yes" determination is determined by the controller 338, then the process can pass from step 604 onto step 605. Such advancement of the processing reflects that OCC system 390 will be activated. Accordingly, in step 605, the controller 338 can signal the modulator 342 to apply a predetermined brake pressure to at least the front wheels 106L, 106R of the vehicle 100. For example, the predetermined brake pressure (OCC_brake_value) can be stored in the data memory portion 400 and utilized by the controller 338. This value is applied to the vehicle braking system 310 upon activation of the OCC system 390.

The controller 338 can communicate with the modulator 342 so as to communicate the predetermined brake pressure to the second friction members 330L, 330R.

The value of predetermined brake pressure can be based on a desired dynamic performance of the vehicle 100, the weight of the vehicle, the gross weight rating of the vehicle and any other appropriate parameter(s). For example, the predetermined brake pressure can be set to a pressure value that can maintain the vehicle 100 in a stopped state when the vehicle 100 is stopped during activation of the OCC system 390. This predetermined pressure can prevent inadvertent movement of the vehicle 100 off of the obstacle either in the forward direction or the rearward direction After step 605 of FIG. 3, the process can pass to step 613. In step 613, the controller 338 applies a processing wait time. For example, a value (Processing_wait_time) can be stored in the data memory portion 400 and input by the controller 338 so as to constitute such processing wait time. Such processing wait time can be based on desired reaction time of the OCC system 390 and processing capabilities of the OCC system. That is, the controller 338 can loops or iterates through the process flow of FIG. 3. The processing wait time of step 613 can dictate a rate the controller 338 loops through the process of FIG. 3. As the processing wait time of step 613 is decreased, the iterations of the process of FIG. 3 preformed by the controller 338 increases per unit of time. As a result, reaction time of the OCC system 390 can increase. However, in conjunction with such increase in reaction time, additional processing bandwidth or capabilities can be required. Accordingly, the processing wait time of step 613 can be varied so as to strike a desired balance between reaction time and available processing resources. In alternate embodiments, the processing wait time of step 613 can be dynamically varied. For example, the processing wait time can be dynamically varied based on the presence of other computing requirements of the controller 338.

As shown in step 613 in FIG. 3, the controller 338 can perform a determination of whether the processing wait time has expired. Upon a "yes" determination, the processing can pass from step 613 to step 601. In step 601, processing continues as described above. Accordingly, the process passing from step 613 to step 601 can constitute the completion of one loop or iteration of an OCC process of the disclosure.

With further reference to step 604, the controller 338 can determine in step 604 that the current vehicle speed is not within the window in which OCC system 390 is activated, i.e. "no" in step 604. Illustratively, in such determination it may be the case that the observed vehicle speed is equal to or exceeds the OCC threshold speed. Accordingly, the process of FIG. 3 can pass from step 604 to step 612. In step 612, the OCC system 390 does not apply a predetermined brake pressure to the second friction members 330L, 330R. Accordingly, the variable OCC_brake_value is assigned a value of zero.

After step 612, the process passes to step 613. In step 613, the process continues as described above.

With further reference to step 602 of FIG. 3, the controller 338 can determine that the throttle value does not indicate a "yes" throttle state in step 602, i.e. "no" in step 602. For example, the controller 338, based on input from the accelerator position sensor 350, can determine that the operator is activating the accelerator input member 314. That is the accelerator input member 314 is in the released position. Accordingly, the process of FIG. 3 passes from step 602 onto step 611. Step 611 reflects an aspect of processing (of the OCC system) to provide a timed brake hold when the operator releases the accelerator input member 314 after the OCC system has applied the predetermined brake pressure. Such aspect of the processing can allow the operator to transition to the braking input member 312 so as to maintain the vehicle 100 in position and possible prevent inadvertent movement of the vehicle 100 along or off of the obstacle.

In step 611, the controller 338 can perform a determination based upon data from the acceleration input member 314 in the data memory portion 400. In such processing, the controller determines, based on stored data, whether a "yes" throttle state occurred within the last 1.5 seconds, in accordance with at least one embodiment of the disclosure. The processing of step 611 can use a variable Timed_brake_hold as shown in the data memory portion 400 of FIG. 4. The value of the variable Timed_brake_hold dictates an amount of time that the predetermined pressure is applied by the OCC system to maintain brake pressure after the operator releases the accelerator input member 314. A predetermined lag time can be varied as desired based on the intended dynamic performance of the vehicle 100 and the operator's perception of the OCC system 390 with respect to comfort and convenience. For example, the particular value of the variable Timed_brake_hold might be varied based on weight of the vehicle or size of the wheel or tire, for example. In alternate embodiments of, the particular value of the variable Timed_brake_hold might be varied based on dynamic parameters that can be determined or observed by sensors on the vehicle 100. For example, such dynamic parameters that might be used to control the Timed_brake_hold can include angle of the vehicle 100 or estimated weight of the vehicle 100. The estimated weight of the vehicle 100 might be determined based on number of occupants in the vehicle and amount of fuel/gas in the vehicle, for example. The number of occupants in the vehicle 100 might be determined based on weight sensors in the respective seats of the vehicle 100. The amount of fuel in the vehicle 100 can be based on a fuel sensor of the vehicle 100.

In the processing of step 611, different processing approaches can be utilized by the controller 338. For example, "timestamp" based processing can be utilized in step 611. With such approach, the controller 338 can observe the time at which the operator has released the acceleration input member 314. Accordingly, in the processing of step 611, the "current time" is compared with the timestamp time. If difference in the compared time stamps more than 1.5 seconds, then the controller returns a "no" determination in step 611. If 1.5 or less seconds have elapsed, then the controller returns a "yes" determination in step 611.

Alternatively, a timer approach can be utilized by the controller 338 in the processing of step 611. For example, upon the controller 338 observing that the acceleration input member 314 has been released, the controller 338 can start a timer. In the processing of step 611, the controller 338 can compare a current time with a stop time. If more than 1.5 seconds has elapsed, then a "no" determination is found in step 611. Alternatively, if 1.5 seconds or less has elapsed with the timer time, then a "yes" determination is found in the processing of step 611.

It is appreciated that other timer or historical data analysis approaches can be utilized in the processing of step 611 to determine if the desired lag time has expired. In some embodiments, the processing of step 611 can include a determination of whether a braking input member, such as braking input member 312, has been engaged. An advantage provided by the processing of step 611 is to allow the operator to transition his or her foot from the accelerator to the brake pedal. Accordingly, in view of such objective, the controller 338 can release the predetermined pressure that is applied by OCC system 390 if the controller 338 determines that the braking input member 312 has been engaged by the operator.

It may be the case that a "yes" determination is found in the processing of step 611. Accordingly, the process passes from step 611 onto step 605. Such processing reflects that the predetermined pressure of OCC system 390 will be activated or remain activated a further amount of time, i.e., until a further iteration of the process of FIG. 3 is performed. The processing of step 605 is described above.

It may be the case that a "no" determination is found in the processing of step 611. Accordingly, the process passes from step 611 onto step 612. Such processing reflects that the predetermined pressure of OCC system 390 will be released. The processing of step 612 is described above.

Figure 5:
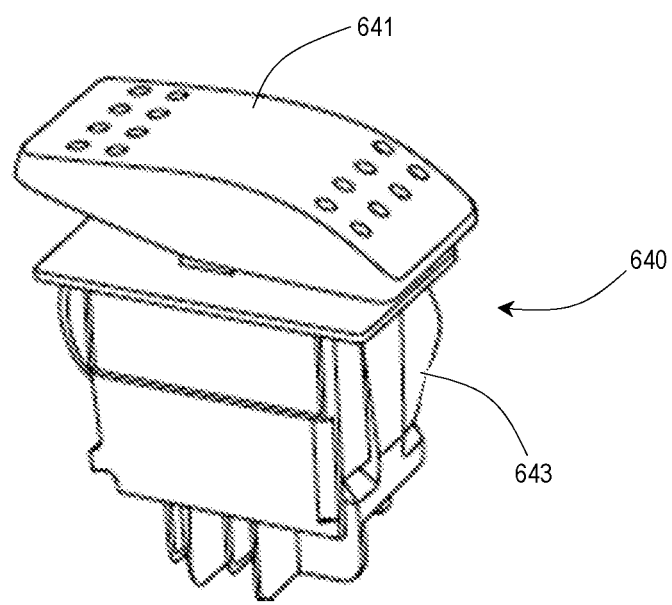
FIG. 5 is a perspective view of an exemplary switch usable with brake control operations in accordance with principles of the disclosed subject matter.

FIG. 5 is a perspective view of an exemplary embodiment of a switch 540, as described above. The switch 540 can include an actuation member 541 and a base member 543. The actuation member 541 can be mounted to the base member 543 so as to be manually movable between an ON position and an OFF position. The base member 543 can be in electrical communication with the controller of the brake control system 302, and be configured to transmit a signal indicative of the position of the actuation member 541.

The switch 540 can be configured such that, when the actuation member 541 is in the OFF position, the switch 540 can either affirmatively send an OFF signal to the controller 338, or the switch 540 can send no signal to the controller. In either case, the controller 338 operates accordingly such as to enable or turn on the OCC system 390 or to turn off the OCC system 390. In at least some embodiments of the disclosure, when the OCC system 390 is turned on, the processing of FIG. 3 will be performed by the controller 338—and when the OCC system 390 is turned off, the processing of FIG. 3 will not be performed. The switch 540 can also be configured such that, when the actuation member 541 is in the ON position, the switch 540 can send an ON signal to the controller 338. Also, in some applications, a second transmission of the ON signal deactivates the OCC system 390.

Hereinafter, further aspects of the power source assembly 104 will be described.

The power source assembly 104 can be an internal combustion engine, an electric motor, or a hybrid of an internal combustion engine and an electric motor 104. The power source, which is configured as an internal combustion engine or a hybrid power source, can have the engine output axis oriented in the longitudinal direction L or in the traverse direction T of the vehicle 100. The engine 104 can be mounted forward of the front axle(s), rearward of the rear axle(s), or intermediate the front and rear axles. In the exemplary embodiment of FIGS. 1 and 2, the power source assembly 104 is configured as a longitudinally-oriented rear-mounted internal combustion engine selectively driving a transmission.

The transmission can be an automatic transmission, a manual transmission, or a semi-automatic transmission. The transmission can include an input shaft, an output shaft, and a speed ratio assembly. A coupling can connect the engine output shaft to the input shaft. The coupling can permit selective engagement/disengagement of the input shaft with the engine output shaft, or at least relative rotation of the engine output shaft with respect to the input shaft, in any appropriate manner known. Exemplary couplings can include, but are not limited to, a friction disc clutch and a torque converter.

The speed ratio assembly can connect the input shaft to the transmission output shaft, such that the transmission output shaft can rotate at variable speeds relative to the input shaft. The speed ratio assembly can be a stepped speed ratio assembly or a continuously variable speed ratio assembly. The transmission input shaft can be referred to as a mainshaft.

A gear shift lever (or switch) can be connected to the transmission, electrically, mechanically, or elector-mechanically, in any manner known in the art such that actuation of the gear shift lever by the operator can effect a shift from one gear ratio to another gear ratio within the transmission. The gear shift lever can be a mechanical lever or an electrical switch, as is known in the art. The gear shift lever can be mounted in any one of a plurality of different locations within the vehicle, including but not limited to, on a center console, on the steering column, on the steering wheel, and on the instrument panel.

While certain embodiments of the invention are described above, it should be understood that the invention can be embodied and configured in many different ways without departing from the spirit and scope of the invention.

For example, embodiments are disclosed above in the context of an off-road vehicle shown in FIGS. 1 and 2. However, embodiments are intended to include or otherwise cover any type of vehicle that includes the brake control system, i.e. the Obstacle Crawl Control (OCC) system as disclosed above. For example, the vehicle can include any number of wheels such as but not limited to three wheels, four wheels, six wheels, or ten wheels. Exemplary embodiments of the vehicle can include a tracked drive arrangement as used on earth-moving vehicles or snow mobiles. Exemplary embodiments are further intended to cover omission of at least one wheel, such as but not limited to a ski as a replacement. However, the above alternative embodiments are merely provided for exemplary purposes, and as indicated above, embodiments are intended to cover any type of vehicular brake control system.

FIG. 4 depicts exemplary numerical values for several of the parameters of the OCC system. However, any appropriate value can be assigned to each of these parameters based on the desired dynamic performance for the vehicle and/or a desired level of comfort and convenience as perceived by an operator of the vehicle.

Exemplary embodiments are intended to include or otherwise cover any number of seats, including a single seat centrally mounted between the front and rear wheels. The single seat can be mounted above the power source assembly, which also can be centrally mounted between the front and rear wheels.

Exemplary embodiments are intended to include one or more of the acceleration input member and the braking input member configured for actuation by an operator's hand instead of by the operator's foot. For example, exemplary embodiments are intended to include or otherwise cover an acceleration input member configured as a twist grip rotatably mounted on a handlebar. In another example, exemplary embodiments are intended to include or otherwise cover an acceleration input member and/or a braking input member configured as a lever pivotally mounted on a handlebar or other support member.

Exemplary embodiments are intended to include or otherwise cover any type of switch that can permit the vehicle operator to at least selectively activate the OCC system. In other words, exemplary embodiments are intended to cover any application of switch that can permit at least selective activation or deactivation of the brake control system disclosed above.

Exemplary embodiments are also intended to cover any type of actuation of the second friction member that can selectively engage/disengage the second friction member with/from the first friction member, including pneumatic actuation, hydraulic actuation, or electrical actuation. Exemplary embodiments are further intended to cover omission of the master cylinder. Exemplary embodiments are further intended to cover omission of the brake modulator in vehicle brake system that uses a respective electrical actuator to selectively engage/disengage the second friction member with/from the first friction member.

The controller 338 can include one or more computers or computer processors. The data memory portion 400 can include or be a part of one or more databases or data memory portions. In addition to the data shown in FIG. 4, the data memory portion 400 can include any other data used by the controller 338 and can include any data generated by the controller 338. The data memory portion 400 can include computer code or instructions that are utilized by the controller 338. The data memory portion 400 can include instructions that can be read and processed by the controller 338 so as to perform any of the features and functionality described herein.

As described above, the processing of FIG. 3 can include application of a same or similar braking pressure to all the wheels 106L, 106R, 108L, 108R of the vehicle 100. However, alternate embodiments can apply the predetermined brake pressure to only the front wheels 106L, 106R or to only the rear wheels 108L, 108R.

The exemplary OCC system can be used when the vehicle is being driven in a forward direction or when the vehicle is being driven in a reverse direction. Accordingly, the processing of step 604 in FIG. 3 can be applied to both movement of the vehicle in the forward direction and movement of the vehicle in a reverse direction.

Embodiments are also intended to include or otherwise cover methods of using and methods of manufacturing the apparatus disclosed above. The methods of manufacturing include or otherwise cover processors and computer programs implemented by processors used to design various elements of the apparatus disclosed above.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A brake traction control system for a vehicle including a vehicle braking system that includes friction members for controlling vehicle speed based on application of pressure, the vehicle including a power source assembly and a manually operated acceleration input member that controls the power source assembly the brake traction control system comprising:
    a manually actuated braking input member that is controllable to manipulate the vehicle braking system by controlling the pressure;
    a brake modulator that is controllable to manipulate the vehicle braking system by controlling the pressure; and
    a controller configured to control the brake modulator in an obstacle crawl control mode such that the controller controls the brake modulator to adjust the pressure, the controller performing processing in the obstacle crawl control mode including:
        performing a first determination to determine whether the acceleration input member is actuated to cause the power source assembly to output a drive torque;
        performing a second determination to determine whether a speed of the vehicle satisfies predetermined criteria; and
        controlling the pressure based on the first determination and the second determination, the controlling the pressure includes signaling the brake modulator to output a predetermined braking pressure to the vehicle braking system when the power source assembly outputs the drive torque.

2. The brake traction control system of claim 1, wherein the performing the first determination including determining that the acceleration input member is actuated; and the performing the second determination including determining that the speed of the vehicle is within a predetermined range.

3. The brake control system of claim 2, further comprising a differential assembly connected between the power source assembly and a pair of drive wheels of the vehicle.

4. The brake traction control system of claim 2, the predetermined range is 0 to 5 miles per hour.

5. The brake traction control system of claim 1, wherein the performing the first determination includes determining whether the acceleration input member has been actuated in a prior period of time, and such prior period of time constituting a timed brake hold.

6. The brake control system of claim 3, wherein the differential assembly includes a torque biasing differential.

7. The brake traction control system of claim 1, wherein the acceleration input member is a pedal that is operative by an operator of the vehicle.

8. The brake traction control system of claim 7, wherein the performing the first determination including inputting data from an accelerator position sensor to determine that the acceleration input member is actuated.

9. The brake traction control system of claim 1, wherein the performing the second determination includes inputting data from a vehicle speed sensor.

10. The brake traction control system of claim 1, wherein
the predetermined criteria is a speed threshold, and
the performing the second determination includes observing that the speed of the vehicle transitions from being below the speed threshold to above the speed threshold, and
the controlling the pressure including transitioning from (a) applying the predetermined braking pressure to brake the vehicle, to (b) releasing the predetermined braking pressure.

11. The brake traction control system of claim 1, wherein
the predetermined criteria is a speed threshold, and
the performing the second determination includes observing that the speed of the vehicle transitions from being above the speed threshold to below the speed threshold, and
the controlling the pressure including transitioning from (a) not applying the predetermined braking pressure to (b) applying the predetermined braking pressure so as to brake the vehicle.

12. A vehicle comprising:
a power source assembly;
a pair of drive wheels configured to be driven by the power source assembly;
a differential assembly connected between the power source and the pair of drive wheels and configured to allow at least one of a speed difference and a torque difference between the pair of wheels when the differential receives a drive torque from the power source assembly;
a manually operated acceleration input member that controls the power source assembly to output a drive torque to the differential assembly; and
a vehicle braking system that includes friction members for controlling vehicle speed based on application of fluid pressure, and the vehicle braking system including:
a manually actuated braking input member that is controllable to manipulate the vehicle braking system by controlling the fluid pressure;
a brake modulator that is controllable to manipulate the vehicle braking system by controlling the fluid pressure; and
a controller that is configured to control the brake modulator to operate in an obstacle crawl control mode such that the controller controls the brake modulator to adjust the fluid pressure, the controller performing processing in the obstacle crawl control mode including:
performing a first determination to determine whether the acceleration input member is actuated to cause the power source assembly to output the drive torque to the differential assembly;
performing a second determination to determine whether speed of the vehicle satisfies predetermined criteria; and
controlling the fluid pressure based on the first determination and the second determination, the controlling the fluid pressure includes signaling the brake modulator to output a predetermined braking pressure when the power source assembly outputs the drive torque and the speed of the vehicle satisfies the predetermined criteria.

13. The vehicle of claim 12, wherein the power source assembly includes an internal combustion engine, and an accelerator position sensor that is configured to output data indicative of the position of the acceleration input member; and
the performing the first determination to determine whether the acceleration input member is actuated is based on the data.

14. The vehicle of claim 12, further comprising a manually operated switch configured to selectively instruct the controller to activate and deactivate the obstacle crawl mode.

15. The vehicle of claim 12, wherein
the performing the first determination including determining that the acceleration input member is actuated; and
the performing the second determination including determining that the speed of the vehicle is within a predetermined range.

16. The vehicle of claim 12, wherein the controller determining whether the acceleration input member has been actuated in a prior period of time, and such prior period of time constituting a timed brake hold in which the friction members will be applied.

17. The vehicle of claim 12, wherein
the predetermined criteria is a speed threshold, and
the performing the second determination includes observing that the speed of the vehicle transitions from being below the speed threshold to above the speed threshold, and
the controlling the pressure including transitioning from (a) applying the predetermined braking pressure to brake the vehicle, to (b) releasing the predetermined braking pressure.

18. The vehicle of claim 12, wherein
the predetermined criteria is a speed threshold, and
the performing the second determination includes the controller observing that the speed of the vehicle transitions from being above the speed threshold to below the speed threshold, and the controlling the pressure including transitioning from (a) not applying pressure to (b) applying the predetermined braking pressure so as to brake the vehicle.

19. The vehicle of claim 12, wherein the differential assembly includes a torque biasing differential.

20. A method of controlling traction for drive wheels of a vehicle, the method comprising:
providing a vehicle with a vehicle braking system that includes friction members for controlling vehicle speed based on application of fluid pressure, the vehicle including a power source assembly and a manually operated acceleration input member that controls the power source assembly to regulate a drive torque, the vehicle including:
a manually actuated braking input member that is controllable to manipulate the vehicle braking system by controlling the fluid pressure; and
a brake modulator that is controllable to manipulate the vehicle braking system by controlling the fluid pressure;
providing a controller that controls the brake modulator to operate in an obstacle crawl control (OCC) mode such that the controller controls the brake modulator to adjust the fluid pressure;
performing, by the controller in the OCC mode, a first determination to determine whether the acceleration input member is actuated to cause the power source assembly to output the drive torque;

performing, by the controller in the OCC mode, a second determination to determine whether speed of the vehicle satisfies predetermined criteria; and controlling, by the controller in the OCC mode, the brake modulator to output a predetermined braking pressure when the acceleration input member is actuated.

\* \* \* \* \*